United States Patent [19]

Takeshita et al.

[11] Patent Number: 5,439,613
[45] Date of Patent: Aug. 8, 1995

[54] LIQUID CRYSTAL COMPOSITION

[75] Inventors: Fusayuki Takeshita, Shigaken; Taku Hirose, Chibaken; Kanetsugu Terashima, Shigaken; Sinichi Sawada, Chibaken, all of Japan

[73] Assignee: Chisso Corporation, Osaka, Japan

[21] Appl. No.: 173,068

[22] Filed: Dec. 27, 1993

[30] Foreign Application Priority Data

Dec. 28, 1992 [JP] Japan ................. 4-360271

[51] Int. Cl.$^6$ ............... C09K 19/30; C09K 19/32; C09K 19/12; G02F 1/13
[52] U.S. Cl. .................. 252/299.63; 252/299.62; 252/299.66; 359/103
[58] Field of Search ........ 252/299.62, 299.63, 252/299.66, 299.6; 359/103

[56] References Cited

U.S. PATENT DOCUMENTS

| | | | |
|---|---|---|---|
| 4,316,041 | 2/1992 | Totten et al. | 556/420 |
| 4,547,309 | 10/1985 | Mochizuki et al. | 252/299.63 |
| 4,614,619 | 9/1986 | Shannon . | |
| 4,637,896 | 1/1987 | Shannon . | |
| 4,952,335 | 8/1990 | Furukawa et al. | 252/299.61 |
| 5,089,169 | 2/1992 | Mochizuki et al. | 252/299.65 |
| 5,114,614 | 5/1992 | Emoto et al. | 252/299.65 |
| 5,198,151 | 3/1993 | Kuratate et al. | 252/299.66 |

FOREIGN PATENT DOCUMENTS

| | | |
|---|---|---|
| 0115134 | 8/1984 | European Pat. Off. . |
| 0481293 | 4/1992 | European Pat. Off. . |
| 0019482 | 2/1979 | Japan . |
| 0149978 | 9/1983 | Japan . |
| WO91/00898 | 1/1991 | WIPO . |
| WO91/16396 | 10/1991 | WIPO . |
| WO91/16399 | 10/1991 | WIPO . |

*Primary Examiner*—Cynthia Harris
*Attorney, Agent, or Firm*—Wenderoth, Lind & Ponack

[57] ABSTRACT

A liquid crystal composition which is a liquid crystal mixture of an achiral liquid crystal compound of the following formula (IV) with a chiral compound having an adsorptivity to adsorbents, not greater than that of the achiral compound:

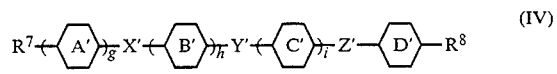

wherein six-membered rings A', B', C' and D' each independently are trans-1,4-cyclohexylene, 1-cyclohexene-1,4-diyl or 1,4-phenylene; g, h and i each are 0 or 1; $(g+h+i) \geq 1$; X', Y' and Z' each independently are a single bond, $-CH_2-CH_2-$, $-CH=CH-$ or $-C\equiv C-$; $R^7$ is $C_nH_{2n+1}-$, $C_nH_{2n-1}$ or $C_nH_{2n+1}OC_kH_{2k}-$; $R^8$ is $C_mH_{2m+1}-$, $C_mH_{2m+1}O-$, F, $CHF_2O$ or $CF_3O-$; n and m each independently are an integer of 1 to 18; k is an integer of 1 to 17; (n+k) is 2 to 18; at least one of X', Y' and Z' is single bond; when ring D' is 1,4-phenylene and $R^8$ is F, $CHF_2O-$ or $CF_3O-$, then H at ortho position as regards $R^8$ may be replaced by F; and when g is 1 and ring B' or C' is 1,4-phenylene, then H at the lateral position of the ring may be replaced by F.

8 Claims, No Drawings

LIQUID CRYSTAL COMPOSITION

BACKGROUND OF THE INVENTION

1. Field of the Invention

This invention relates to a liquid crystal composition for liquid crystal display elements and a liquid crystal display element using the same. More particularly, it relates to a liquid crystal composition for liquid crystal display elements of passive mode and active matrics mode, requiring a high reliability.

2. Description of the Related Art

In order that liquid crystal compositions used for conventional liquid crystal display elements exhibit positive or negative dielectric anisotropy, compounds having CN group at the terminal group or on the side chain of the molecule have often been used. Further, in order that the compositions have a broad liquid crystal phase temperature range, compounds containing an ester group in the molecule have often been used. In recent years, as the application range of liquid crystal display elements has been broadened, there have been increasing requirements for high reliability such as a high resistivity of liquid crystal materials, a low current consumption of liquid crystal elements, a high voltage-holding ratio (abbreviated to V.H.R.), etc. as well as a high contrast of display, etc., in the passive mode, active matrics mode display, and the like.

Liquid crystal materials using compounds having a group of strong polarity such as cyano group have a large contribution to the dielectric anisotropy, but the liquid crystal elements using such compounds have raised problems directed to the current consumption of the elements and hence to the display contrast. The reason has not yet been elucidated by persons of skill in the art, but it has been considered as follows:

The CN group of the terminal group or the side chain exerts a certain interaction with ionic impurities present in the display element, whereby when the compound is used for a liquid crystal element material, it has a bad influence upon the electric current value, the resistivity and the voltage-holding ratio and hence upon the contrast of display.

In order to solve these problems, liquid crystal materials composed mainly of compounds having fluorine atom in the molecule have recently been developed for exhibiting dielectric anisotropy (for example, see Japanese patent application laid-open No. Hei 2-289682).

When liquid crystal materials are used for display elements, a small quantity of a..chiral agent has usually been mixed in order to improve the alignment of liquid crystal molecules in the elements.

As such a chiral agent, for example, the following optically active compounds have been used:

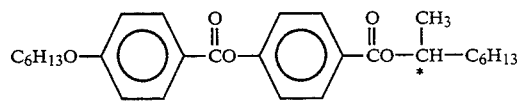

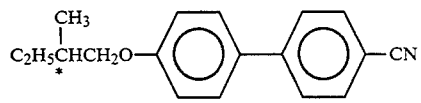

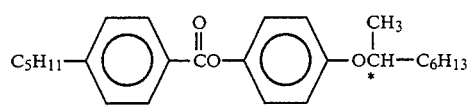

Further, it has been reported that when two or more kinds of chiral compounds having different temperature-dependencies of the helical pitch of liquid crystal materials are blended and used as a chiral agent, it is possible to reduce the temperature-dependency of driving voltage (Japanese patent application laid-open No. Sho 63-22893).

The liquid crystal materials used for the display elements, for which the above-described high reliability and high contrast have been required, are obtained by adequately melting and blending liquid crystal compounds highly purified by means of recrystallization, column chromatography, etc., depending upon the use objects thereof, to thereby achieve the above requirements, and these liquid crystal materials usually contain chiral agents. During the preparation of these liquid crystal materials, ionic impurities are included therein. In order to remove the impurities from the liquid crystal materials, treatment with adsorbents, etc. or purification according to column chromatography are effective.

When a liquid crystal composition obtained by blending a chiral agent so far preferably used, with a fluorine-containing achiral liquid crystal compound, is purified according to treatment with an adsorbent or column chromatography, then the fluorine-containing achiral liquid crystal compound has a lower adsorptivity to the adsorbent or column packing than that of conventional chiral agent compound; hence the chiral agent is selectively adsorbed and the concentration of the chiral compound contained in the liquid crystal composition is reduced, so that the value of the helical pitch of the resulting liquid crystal material becomes longer than the desired value, resulting in an inferior display of the element.

SUMMARY OF THE INVENTION

As apparent from the foregoing, the object of the present invention is to provide a liquid crystal mixture mainly containing a liquid crystal material having a small current consumption and a high voltage-holding ratio when used in liquid crystal elements, and further containing a chiral compound, the concentration of which is not so changed when the mixture is purified by adsorbent or the like.

The present invention has the following main constitutions:

(1) A liquid crystal composition comprising an achiral compound expressed by the following formula (I) as a main component and a chiral compound having an adsorptivity to adsorbents not greater than that of said achiral compound:

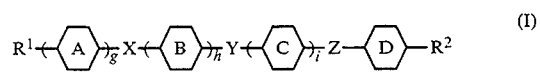

wherein six-membered rings A, B, C and D each independently represent trans-1,4-cyclohexylene, 1-cyclohexene-1,4-diyl or 1,4-phenylene; g, h and i each represent 0 or 1; $(g+h+i) \geq 1$; X, Y and Z each independently represent a single bond, —CH$_2$—CH$_2$—, —CH=CH—, —C≡C—, —OCH$_2$— or —CH$_2$O—; R$^1$ and R$^2$ each independently represent H, C$_n$H$_{2n+1}$—, C$_n$H$_{2n+1}$O—, C$_n$H$_{2n+1}$—O—C$_k$H$_{2k}$—, C$_n$H$_{2n-1}$—, C$_n$H$_{2n-1}$O—, C$_n$H$_{2n-1}$—O—C$_k$H$_{2k}$—, C$_n$H$_{2n-3}$—, C$_n$H$_{2n-3}$—, or C$_n$H$_{2n-3}$-O-C$_k$H$_{2k}$—; n and k each independently represent an integer of 1 to 18; (n+k)≦18; and at least one of H atoms in the formula may be replaced by F atom.

(2) A liquid crystal composition comprising an achiral compound expressed by the formula (I), set forth in item (1), as a main component, and a compound expressed by the following formula (II) or a compound expressed by the following formula (III), as a chiral compound having almost the same as or less adsorptivity to adsorbents than that of the component of the formula (I):

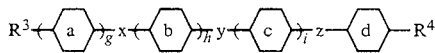
(II)

wherein six-membered rings a, b, c and d each independdently represent trans-1,4-cyclohexylene, 1-cyclohexene-1,4-diyl or 1,4-phenylene; g, h and i each represent 0 or 1; (g+h+i)≧1; x, y and z each independently represent a single bond, —CH$_2$—CH$_2$—, —CH=CH—, —C≡C—, —OCH$_2$— or —CH$_2$O—; R$^3$ and R$^4$ each independently represent H, C$_n$H$_{2n+1}$—, C$_n$H$_{2n+1}$O—, C$_n$H$_{2n+1}$—O—C$_k$H$_{2k}$—, C$_n$H$_{2n-1}$, C$_n$H$_{2n-1}$—O—, C$_n$H$_{2n+1}$—O—C$_k$H$_{2k}$—, C$_n$H$_{2n-3}$—, C$_n$H$_{2n-3}$O— or C$_n$H$_{2n-3}$—O—C$_k$H$_{2k}$—; n and k each independently represent an integer of 1 to 18; (n+k)≦18; at least one H atom in the formula may be replaced by F atom; and at least one of R$^3$, R$^4$, x, y, and z has an asymmetric carbon atom; and

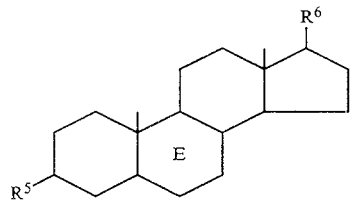
(III)

wherein R$^5$ represents H, F, C$_n$H$_{2n+1}$—, C$_n$H$_{2n+1}$O—, C$_n$H$_{2n+1}$COO—, C$_n$H$_{2n+1}$OCO—, C$_n$H$_{2n-1}$—, C$_n$H$_{2n-1}$O—, C$_n$H$_{2n-1}$COO—, C$_n$H$_{2n-1}$OCO—, C$_n$H$_{2n-3}$—, C$_n$H$_{2n-3}$O—, C$_n$H$_{2n-3}$COO—, C$_n$H$_{2n-3}$OCO—, C$_n$H$_{2n+1}$—Ph—COO— or C$_n$H$_{2n+1}$—Ph—OCO— wherein n represents an integer of 1 to 18 and Ph represents 1,4-phenylene; R$^6$ represents H, C$_n$H$_{2n+1}$— or C$_n$H$_{2n-1}$— wherein n represents an integer of 1 to 18; and ring E represents a condensed ring having only one double bond at its 5-6, 6-7 or 7-8 position or a condensed ring wherein the hydrogen atom at 5-position or 6-position may be replaced by an alkyl group or an alkoxy group of 1 to 18 carbon atoms.

DETAILED DESCRIPTION OF PREFERRED EMBODIMENTS

As achiral compounds preferred as the component of the present invention, those expressed by the following formula (IV) are mentioned:

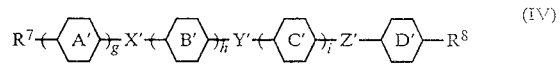
(IV)

wherein six-membered rings A', B', C' and D' each independently represent trans-1,4-cyclohexylene ring, 1-cyclohexene-1,4-diyl ring or 1,4-phenylene ring; g, h and i each represent 0 or 1; (g+h+i)≧1; X', Y' and Z' each independently represent a single bond, —CH$_2$—CH$_2$—, —CH=CH— or —C≡C—,; R$^7$ represents C$_n$H$_{2n+1}$—, C$_n$H$_{2n-1}$— or C$_n$H$_{2n+1}$OC$_k$H$_{2k}$—; R$^8$ represents C$_m$H$_{2m+1}$—, C$_m$H$_{2m+1}$O—, F, CHF$_2$O— or CF$_3$O—; n and m each independently represent an integer of 1 to 18; k represents an integer of 1 to 17; (n+k) represents an integer of 2 to 18; at least one of X', Y' and Z' represents a single bond; when ring D' represents 1,4-phenylene ring and R$^8$ represents F, CHF$_2$O— or CF$_3$O—, H at ortho-position as regards R$^8$ may be replaced by F; and when g represents 1 and ring B' or ring C' represents 1,4-phenylene ring, H at the side position of the ring may be replaced by F.

As chiral compounds preferred as the component of the present invention, compounds expressed by the following formula (V) and the following formula (VIII) are mentioned:

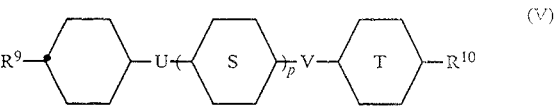
(V)

wherein six-membered rings S and T each represent trans-1,4-cyclohexylene ring or 1,4-phenylene ring; when ring T represents 1, 4-phenylene group, H at its 2-position or 3-position may be replaced by F; p represents an integer of 0 or 1; U and V each represent a single bond or —CH$_2$CH$_2$—, but are not simultaneously —CH$_2$CH$_2$—; R$^9$ represents C$_n$H$_{2n+1}$—; n represents an integer of 1 to 18; and R$^{10}$ is expressed by the following partial formula (VI):

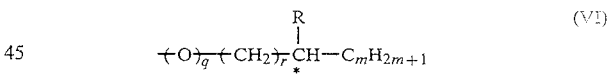
(VI)

wherein q and r each independently represent an integer of 0 or 1; m represents an integer of 2 to 12; and R represents F— or CH$_3$—, and

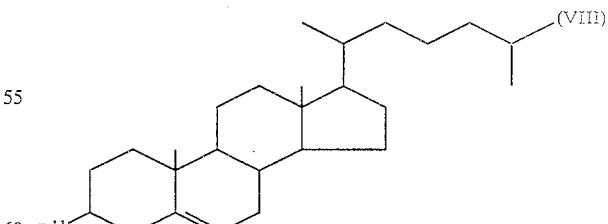
(VIII)

wherein R$^{11}$ represents H, F, C$_n$H$_{2n+1}$—, C$_n$H$_{2n+1}$O—, C$_n$H$_{2n+1}$COO—, C$_n$H$_{2n+1}$OCO—, C$_n$H$_{2n-1}$O—, C$_n$H$_{2n-1}$O—, C$_n$H$_{2n-1}$COO— or C$_n$H$_{2n-1}$OCO—; and n represents an integer of 1 to 18.

As compounds preferably used as the compound of the formula (I), compounds expressed by the following formulas are mentioned:

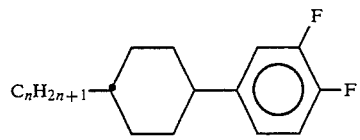
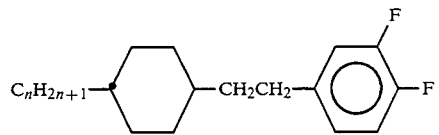
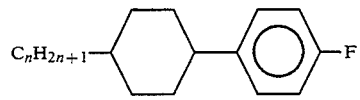
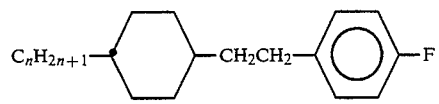
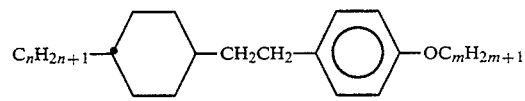
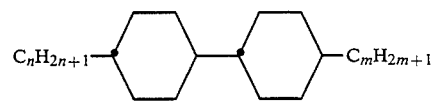
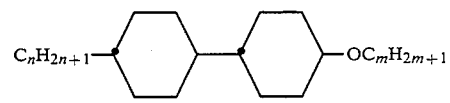
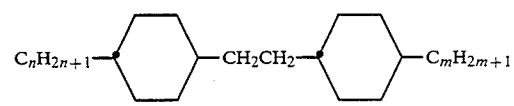
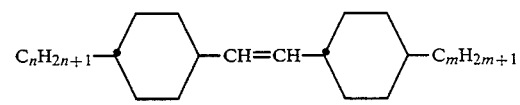
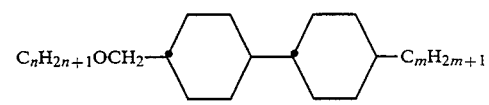
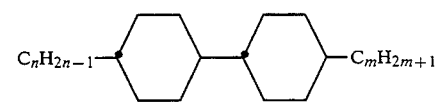
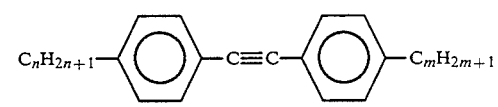

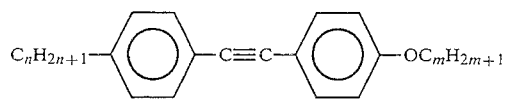
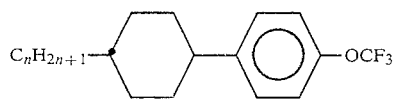
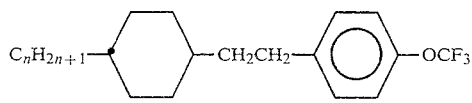
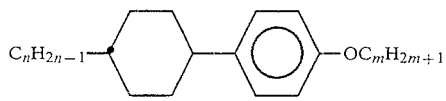
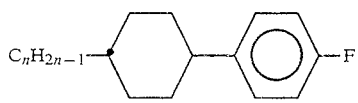
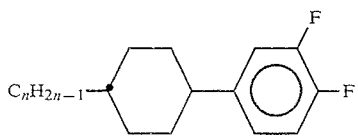
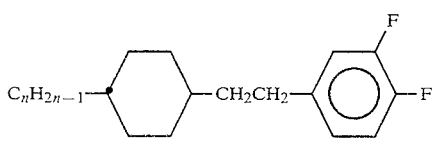
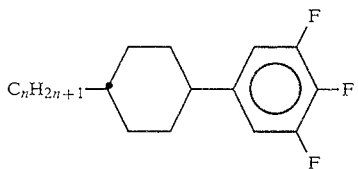
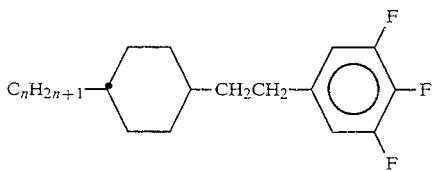
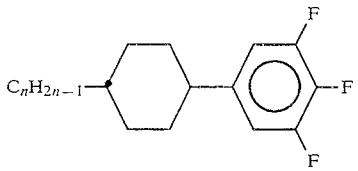
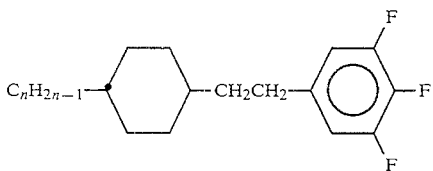

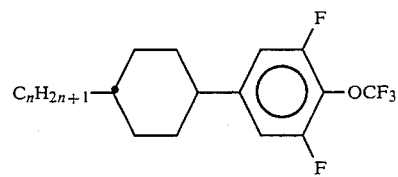
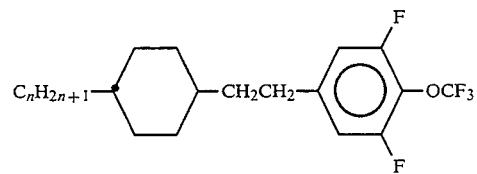
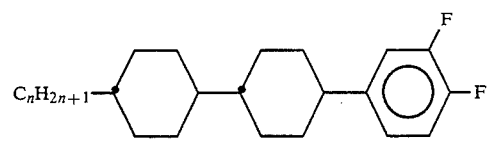
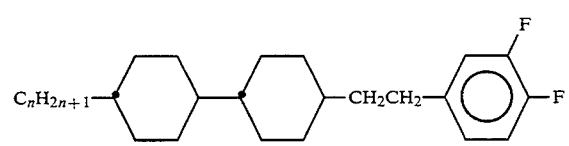
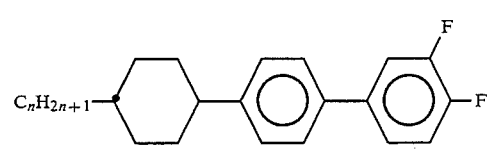
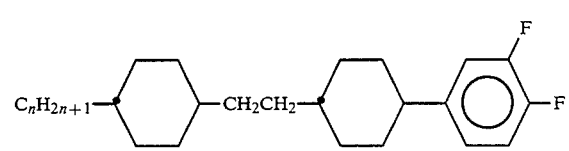
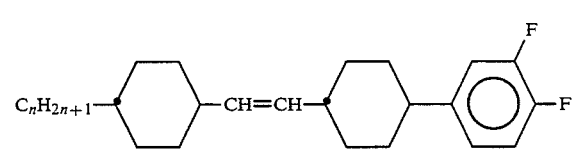
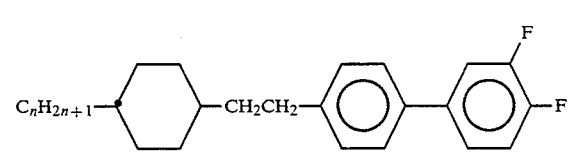
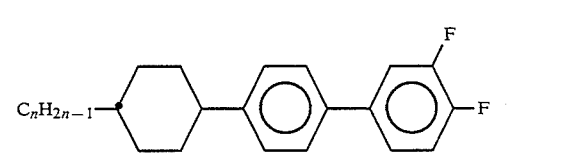
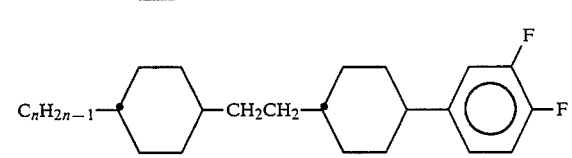
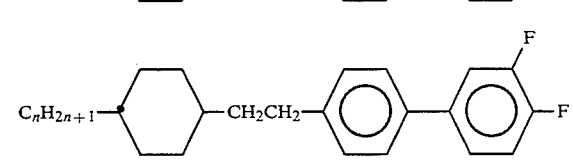

-continued
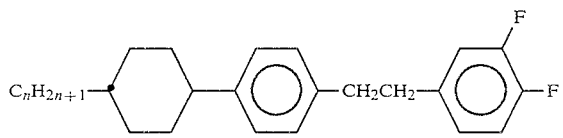
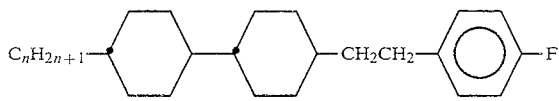
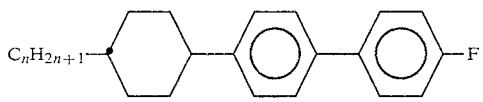
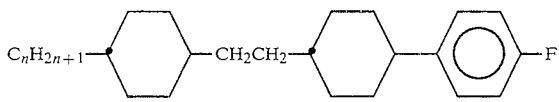
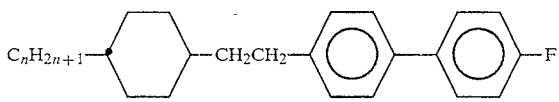
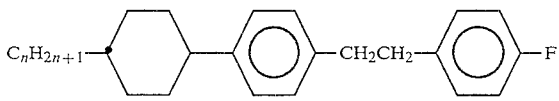
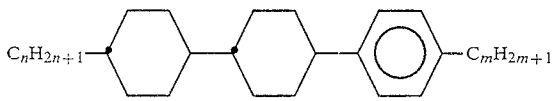
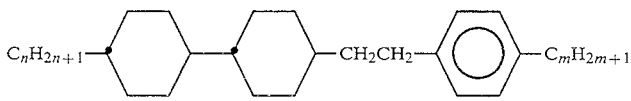
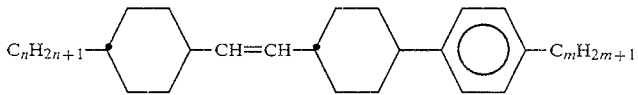
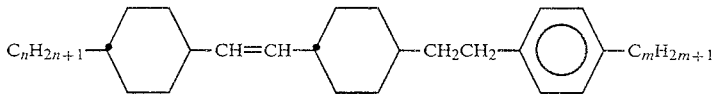
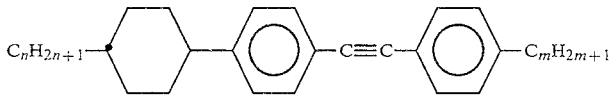
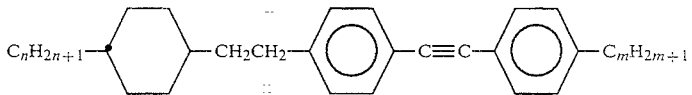

-continued
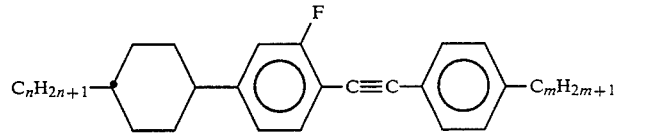
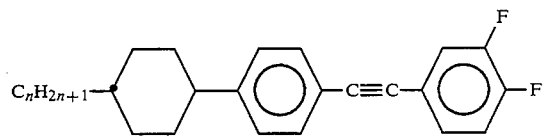
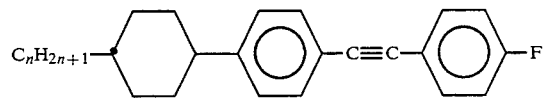
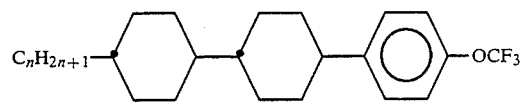
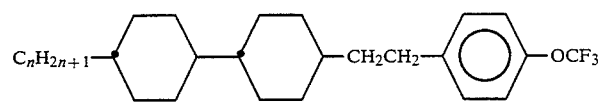
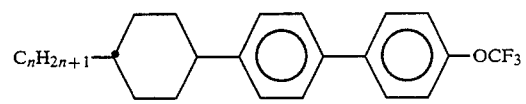
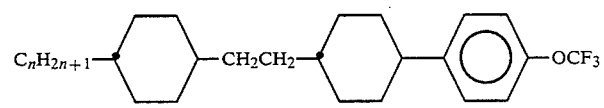
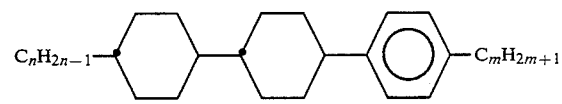
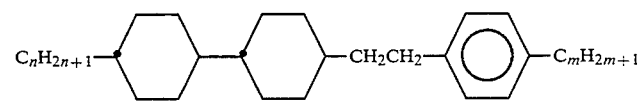
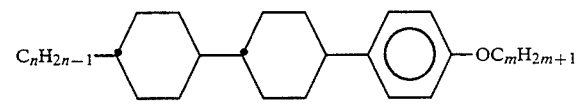
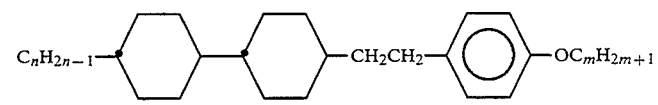
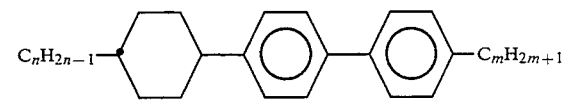
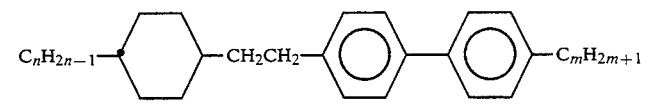

-continued
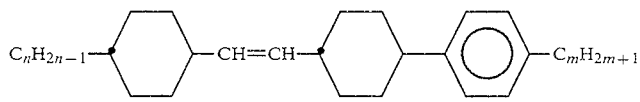
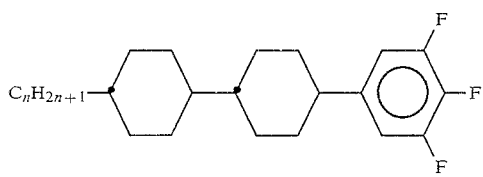
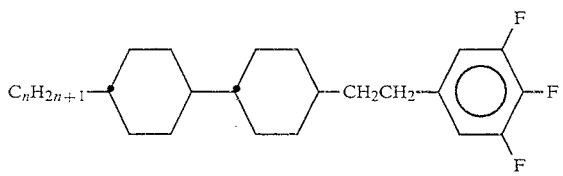
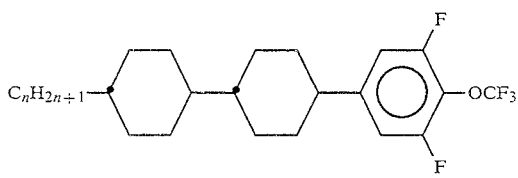
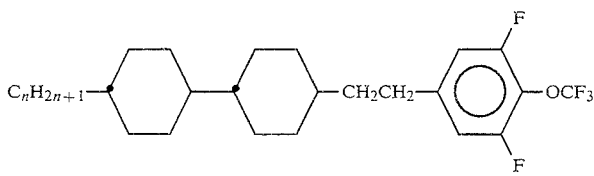
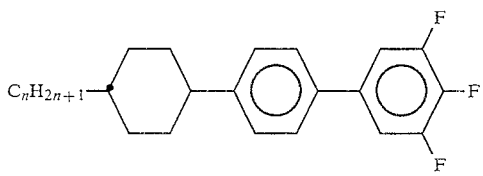
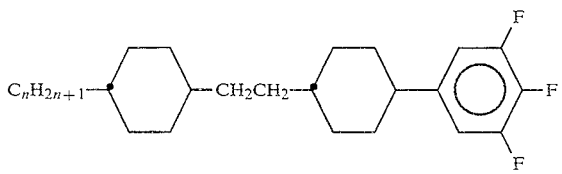
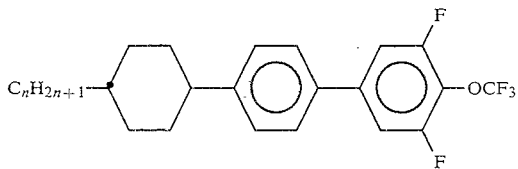
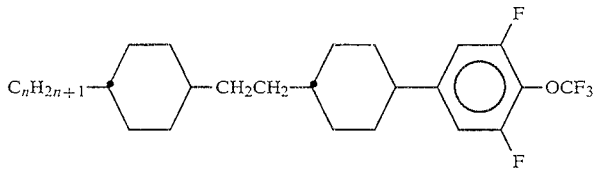

-continued
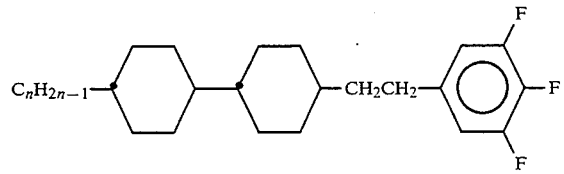
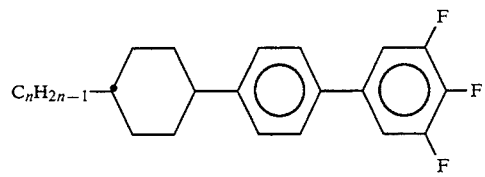
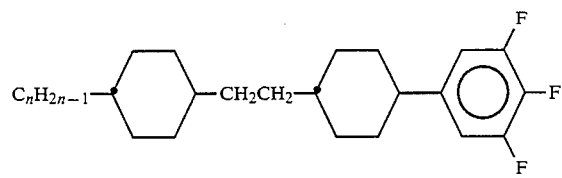
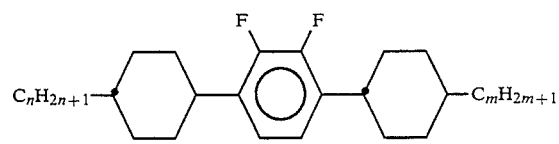
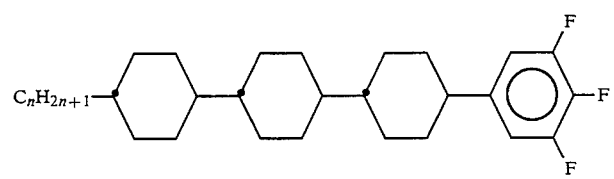
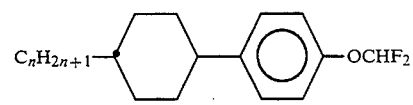
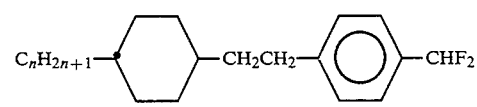
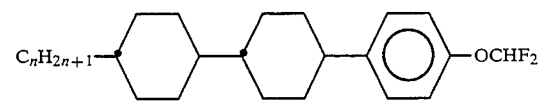
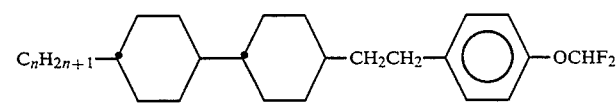
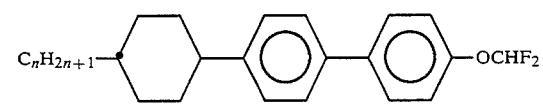
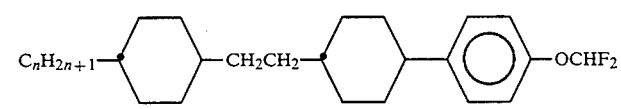

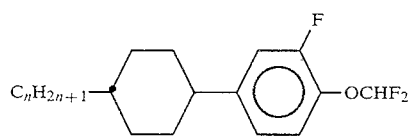
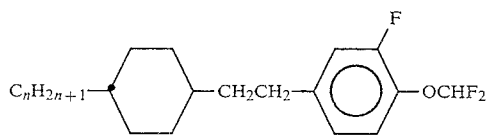
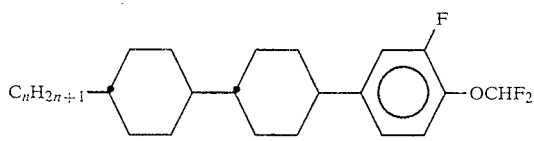
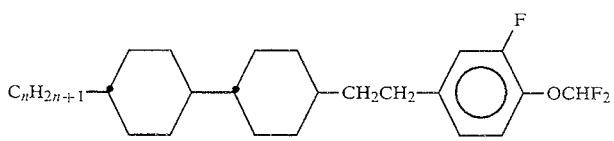
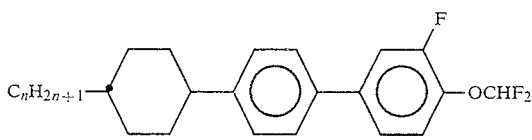
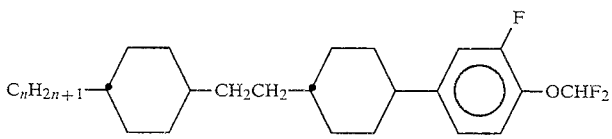
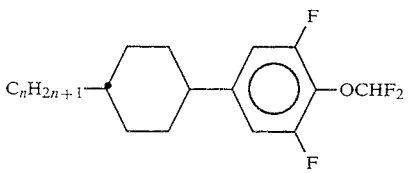
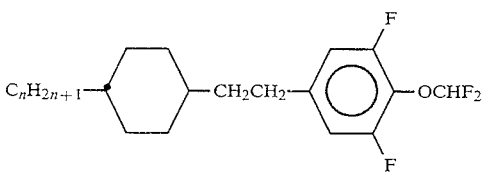
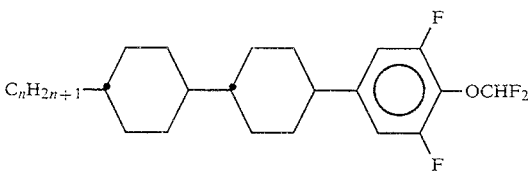
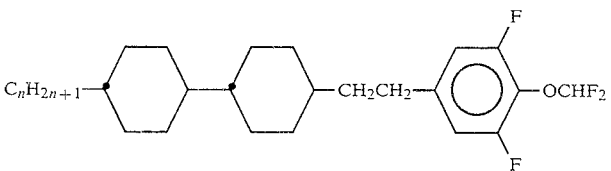

-continued

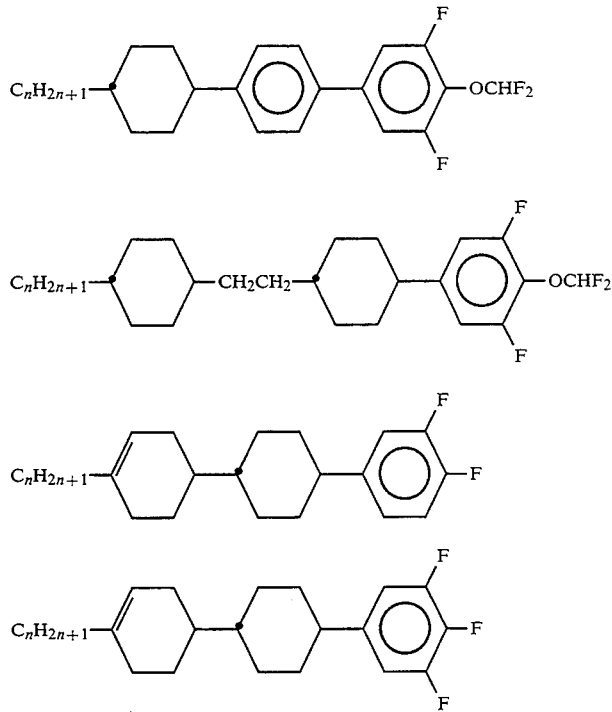

In these formulas, n and m each represent an integer of 1 to 18 and (n+m) is 2 to 20.

Among the compounds expressed by these formulas, compounds having a polar group as the terminal group thereof are preferably used. Among compounds having a polar group as the terminal group and having two six-membered rings, those having an n value of 2 to 14 in the exemplified formulas are preferable, and those having an n value of 3 to 8 are more preferable. Further, among compounds having a polar group and three six-membered rings, those having an n value of 2 to 10 in the above formulas are preferable, and those having an n value of 2 to 5 are more preferable.

The compounds expressed by the formula (I) are those having only functional group(s) (such as halogen atom e.g. fluorine atom, hydrogen atom, alkoxy group, etc.) having a not so high adsorptivity to silica gel or the like. When the compounds are used as a material for liquid crystal elements, it is preferred in order to exhibit a high voltage-holding ratio, that the liquid crystal compounds of the formula (I) have as a polar group, a functional group (such as F and CF$_3$O—) limited to a halogen atom such as F, Cl, etc. or an ether bond, besides the C-C bond and the C-H bond.

Among compounds having no polar group at the terminal group in the above formulas, those having three six-membered rings are preferred to have an n or m value of 2 to 10, and more preferred to have a (n+m) value of 3 to 7, and those having two six-membered rings are preferred to have an n or m value of 2 to 14, and more preferred to have a (n+m) value of 3 to 7.

In the present invention, as compounds having almost the same as or less adsorptivity than that of the component expressed by the formula (I), it is possible to use optically active compounds expressed by the formula (II) or (III). As the compounds of the formula (II), the optically active compounds expressed by the following formulas can be exemplified as preferable component compound:

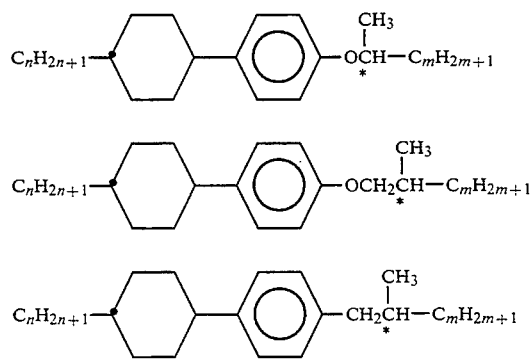

-continued
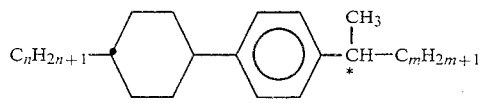
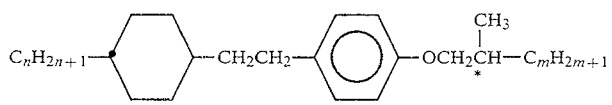
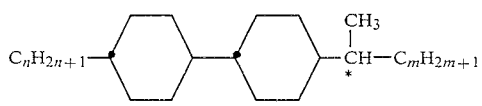
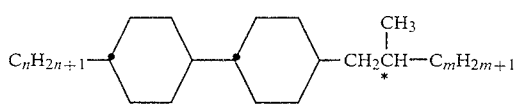
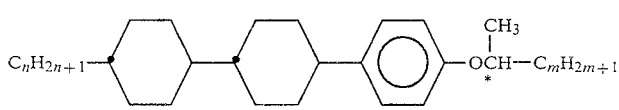
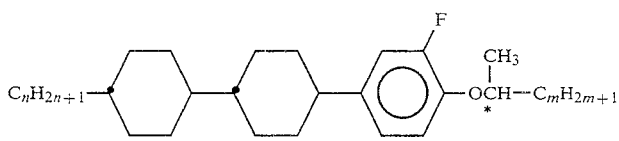
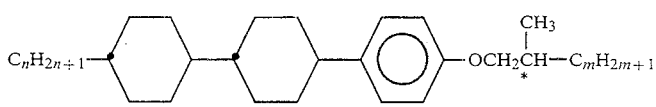
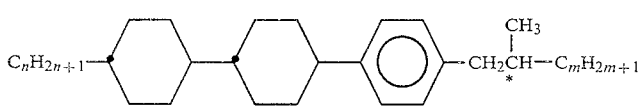
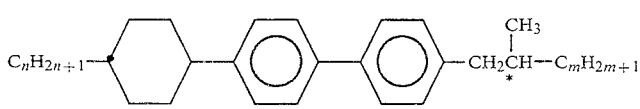
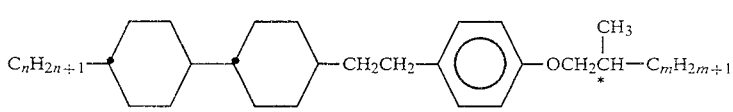
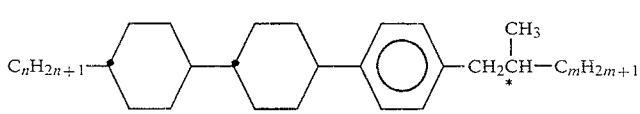

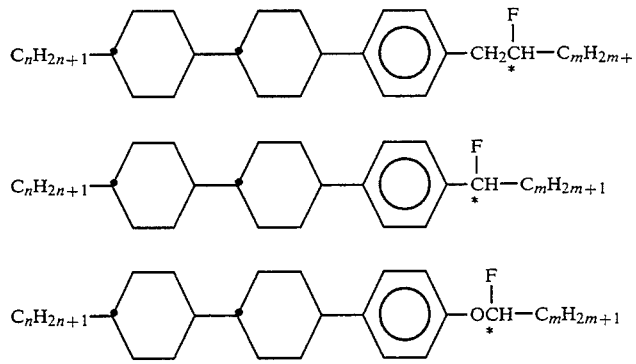

In these formulas, n represents an integer of 1 to 18, m represents an integer of 2 to 18 and (n+m) represents 3 to 20. Among these optically active compounds, those having a linear alkyl group wherein m represents 2 to 10, bonded to an asymmetric carbon atom are preferred, and those wherein m represents 2 to 6 are more preferred.

As to chiral compounds of the present invention having an adsorptivity to adsorbents, not greater than that of the compounds of the formula (I), those having a functional group restricted to only a halogen atom or an ether bond as in the case of the compounds of the formula (I), if the compounds are to have a polar group, are preferred in the aspect that the compounds are a component of liquid crystal materials required to exhibit a high voltage-holding ratio. In the same aspect, chiral agent compounds having a polar group of —CN group as a functional group are unsuitable.

Further, among the compounds expressed by the formula (III), those expressed by the following formulas are preferably used:

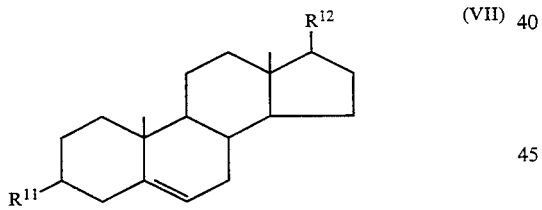
(VII)

wherein $R^{11}$ represents H, F, $C_nH_{2n+1}$—, $C_nH_{2n+1}O$—, $C_nH_{2n+1}COO$—, $C_nH_{2n+1}OCO$—, $C_nH_{2-n}O$—, $C_{2n-1}O$—, $C_nH_{2n-1}COO$— or $C_nH_{2n-1}OCO$—, $R^{12}$ represents $C_nH_{2n+1}$— or $C_nH_{2n-1}$— and n represents an integer of 1 to 18.

Among these compounds, compounds of the following formula (VIII) corresponding to those of the formula (VII) wherein $R^{12}$ represents 1,5-dimethylhexyl are preferably used:

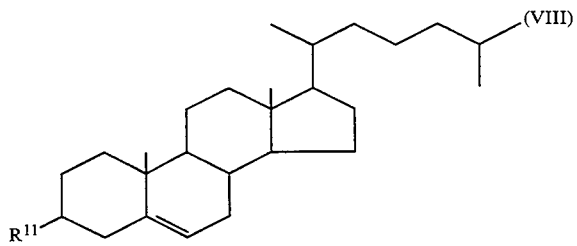
(VIII)

Among chiral compounds expressed by the formula (VIII), those of the formula wherein $R^{11}$ represents an alkyloxy group of 3 to 9 carbon atoms or an alkanoyloxy group of 2 to 9 carbon atoms are preferred, and those of the formula wherein $R^{11}$ represents $C_7H_{15}O$— or $C_8H_{17}COO$— are more preferred. As described below, chiral compounds having a carboxylic acid ester structure (e.g. alkanoyloxy group) as a polar group have been generally regarded to be undesirable in the aspect of adsorptivity, but compounds wherein the number of ester bonds is small for the largeness of the molecular weight as in the case of compounds of the formula (III), can be used as a chiral agent in the present invention.

Next, the present invention will be described by way of an example.

A liquid crystal mixture A was prepared, which consists of trans-4-(trans-4-ethylcyclohexyl)-1-(3,4-difluorophenyl)cyclohexane, trans-4-(trans-4-propylcyclo-hexyl)-1-(3,4-difluorophenyl) cyclohexane and trans-4-(trans-4-pentylcyclohexyl)-1-(3,4-difluorophenyl)cyclohexane, each in equal weight, followed by mixing optically active trans-4-(trans-4-hexyloxycyclohexyl)-1-[4-(1-methylheptyloxy)phenyl)]cyclohexane (referred to as compound a) as a chiral agent in 1% by weight, with the above liquid crystal mixture A, to prepare a chiral nematic liquid crystal mixture A-1 of the present invention. The helical pitch Po at 25° C. and the voltage-holding ratio of the mixture A-1 were 72.5 μm and 98.5%, respectively.

For comparison, optically active 4-(4-hexyloxybenzoyloxy)benzoic acid 1-methylheptyl ester (referred to as compound b) so far used as a chiral agent was mixed in a quantity of 1% by weight, with the above mixture A, to prepare a chiral nematic liquid crystal mixture A-2. The helical pitch Po at 25° C. and the voltage-holding ratio of the mixture A-2 were 8.6 μm and 98.3%, respectively.

An adsorbent (containing 50% by weight or more of silica gel) was added to the respective chiral nematic liquid crystal mixtures A-1 and A-2, in quantities of 1.0%, 3.0% and 10.0% by weight based upon the weight of the mixtures, followed by purification treatment, to measure the helical pitch P thereof at 25° C. The changes of the helical pitch by the purification treatment, P/Po, are shown in Table 1.

TABLE 1

| | V.H.R. (%) | | Proportion of adsorbent added (wt. %) | | | |
|---|---|---|---|---|---|---|
| | | | 0 | 1.0 | 3.0 | 10.0 |
| Mixture | 98.5 | P (μm) | 72.5 | 75.2 | 76.6 | 90.8 |

TABLE 1-continued

| V.H.R. (%) | | Proportion of adsorbent added (wt. %) | | | |
|---|---|---|---|---|---|
| | | 0 | 1.0 | 3.0 | 10.0 |
| A-1 Mixture A-2 | 98.3 | P/Po P (μm) P/Po | — 8.6 — | 1.04 9.7 1.13 | 1.06 13.9 1.62 | 1.25 101.8 11.84 |

The purification treatment was carried out according to a process of adding an adsorbent, followed by agitating the mixture at room temperature .for about 24 hours and then filtering off the adsorbent.

As apparent from Table 1, the helical pitch in the mixture A-1 of the present invention was almost not elongated, whereas the helical pitch in the mixture A-2 using a chiral agent not specified in the present invention was remarkably elongated.

Next, as to the chiral agent compound b so far used, when it is mixed with a compound of the formula (I) as a main component of the present invention, the helical pitch is prolonged by the purification treatment with an adsorbent, whereas when the compound b is mixed with a conventional achiral liquid crystal compound other than a compound of the formula (I), the helical pitch is not elongated even by the purification treatment. This fact will be illustrated by way of the following reference example.

Firstly, the following cyano group nematic liquid crystal mixture B and ester group nematic liquid crystal mixture C were prepared:

| B and | trans-4-propyl-1-(4-cyanophenyl)cyclohexane | 30 parts, |
|---|---|---|
| | trans-4-pentyl-1-(4-cyanophenyl)cyclohexane and | 40 parts, |
| | trans-4-heptyl-1-(4-cyanophenyl)cyclohexane | 30 parts, |
| and | | |
| C | trans-4-propylcyclohexanecarboxylic acid 4-butoxyphenyl ester | 16 parts, |
| | trans-4-butylcyclohexanecarboxylic acid 4-ethoxyphenyl ester | 12 parts, |
| | trans-4-pentylcyclohexanecarboxylic acid 4-methoxyphenyl ester | 12 parts, |
| | trans-4-propylcyclohexanecarboxylic acid 4-ethoxyphenyl ester, and | 10 parts, |
| | trans-4-pentylcyclohexanecarboxylic acid 4-ethoxyphenyl ester. | 8 parts |

Next, the above chiral compound b was mixed in a quantity of 1% by weight to the respective mixture B and mixture C, to prepare chiral nematic mixture B-1 and mixture C-1.

The helical pitches Po at 25° C. of these chiral mixtures B-1 and C-1 were 8.1 μm and 9.4 μm, respectively.

Helical pitches P obtained after these chiral nematic mixtures were subjected to treatment with an adsorbent in the same manner as in mixture A-1, and P/Po are shown together with the V.H.R. in Table 2.

TABLE 2

| | V.H.R. (%) | | Proportion of adsorbent added (wt. %) | | | |
|---|---|---|---|---|---|---|
| | | | 0 | 1.0 | 3.0 | 10.0 |
| Mixture A-2 | 98.3 | P (μm) P/Po | 8.6 — | 9.7 1.13 | 13.9 1.62 | 101.8 11.84 |
| Mixture B-1 | 72.0 | P (μm) P/Po | 8.1 — | 8.4 1.04 | 8.6 1.06 | 9.2 1.14 |
| Mixture C-1 | 92.7 | P (μm) P/Po | 9.4 — | 9.0 0.96 | 9.3 0.99 | 9.1 0.97 |

As seen from the results of Table 2, cyano group mixture B-1 and ester group mixture C-1 each have a notably large reduction of the voltage-holding ratio as compared with that of fluorine group mixture A-2, but elongation of helical pitch by means of purification operation of treatment with adsorbent hardly occurs in mixtures B-1 and C-1. The elongation of helical pitch in the case of the fluorine group mixture occurred since the adsorptivity of the chiral agent compound b is far higher than that of the nematic mixture A. It can be judged that since the component compounds of the mixture B and mixture C have an adsorptivity not so different from or larger than that of the chiral agent compound b, the elongation of the helical pitch of the resulting nematic mixture hardly occurs. Namely, compounds having —CN group or carboxylic acid ester structure as a functional group are unsuitable as an achiral component of the present invention in the aspect of retaining the V.H.R. of the resulting liquid crystal element at a high value.

Similarly, since chiral compounds having a functional group such as —CN group, ester group, etc. have a high adsorptivity, they are generally undesirable as a chiral component in the aspect of voltage-holding ratio, too.

The present invention intends to provide a chiral nematic mixture suitable to purification treatment with adsorbents, by making good use of the characteristics of the component compounds of the mixture A exhibiting a very high V.H.R. and those of a compound exhibiting a high V.H.R. similarly thereto, and by combining a chiral agent compound having an adsorptivity to adsorbents such as silica gel not greater than that of the achiral compound having a very high V.H.R., with the achiral compound.

Next, the fact that the chiral agent compound expressed by the formula (III) is preferred as a component of the present invention, will be described by way of an example.

The following chiral agent compounds expressed by the formulas (IX) and (X) were respectively added in a quantity of 1% by weight to the above mixture A to prepare chiral nematic mixtures A-3 and A-4, followed by comparing their V.H.R.'s and the changes in the helical pitches after treatment with an adsorbent with those of the above mixture A-2, and the results are shown in Table 3.

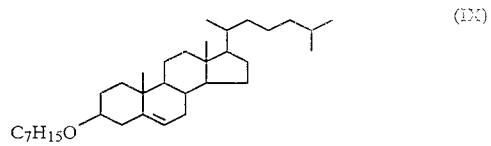

(IX)

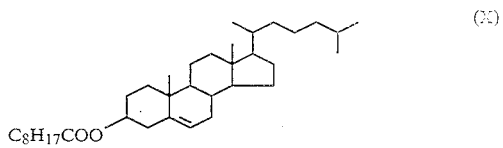

(X)

TABLE 3

| | V.H.R. (%) | | Proportion of adsorbent added (wt. %) | | | |
|---|---|---|---|---|---|---|
| | | | 0 | 1.0 | 3.0 | 10.0 |
| Mixture A-3 | 98.5 | P (μm) P/Po | 14.6 — | 14.7 1.01 | 14.7 1.01 | 15.0 1.03 |
| Mixture A-4 | 98.4 | P (μm) P/Po | 24.9 — | 25.7 1.03 | 29.2 1.17 | 36.5 1.59 |
| Mixture | 98.3 | P (μm) | 8.6 | 9.7 | 13.9 | 101.8 |

TABLE 3-continued

| | V.H.R. (%) | Proportion of adsorbent added (wt. %) | | | |
|---|---|---|---|---|---|
| | | 0 | 1.0 | 3.0 | 10.0 |
| A-2 | P/Po | — | 1.13 | 1.62 | 11.84 |

As seen from Table 3, while the compound of the formula (X) is an ester compound, it has a far larger molecular weight than those of the components of the mixture A and has an adsorptivity to almost the same extent as that of fluorine group compound; hence it is preferably used as a component of the composition of the present invention.

EXAMPLES

The present invention will be described in more detail by way of Examples, but it should not be construed to be limited thereto.

The voltage-holding ratio referred to in Examples and Comparative examples is defined as follows:

A pulse of 5 V, 60 psec is impressed to a liquid crystal cell, followed by seeking the retention voltage for a period of 1/60 sec. according to area method by means of CRT oscilloscope, and defining the percentage of the area of the retention voltage to the area in the case where there is no voltage depression for a period of 1/60 sec., as the V.H.R.

Further, the measurement of the helical pitch was carried out according to Cano wedge method. Treatment with adsorbent was carried out by adding silica gel to a chiral nematic mixture, followed by agitating the mixture at room temperature and filtering off the adsorbent.

EXAMPLE 1

An optically active compound c of the formula

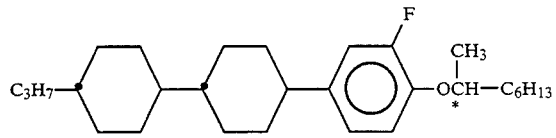

was added in a quantity of 1% by weight to a nematic mixture A as a mixture of equal quantities of three compounds expressed by the following formulas:

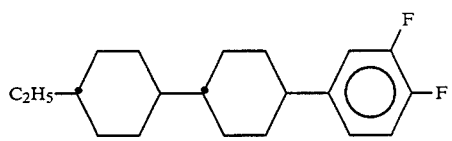

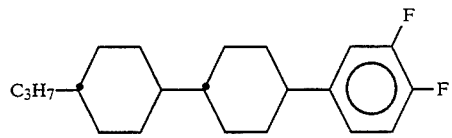

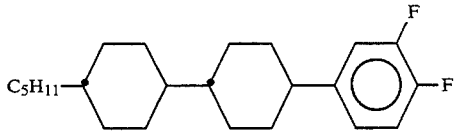

to prepare a chiral nematic mixture A-5.

The V.H.R. of this liquid crystal mixture A-5 and the change in helical pitch after its treatment with an adsorbent are shown in Table 4.

TABLE 4

| | V.H.R. (%) | | Proportion of adsorbent added (wt. %) | | | |
|---|---|---|---|---|---|---|
| | | | 0 | 1.0 | 3.0 | 10.0 |
| Example 1 | 98.5 | P (μm) | 24.6 | 25.1 | 26.1 | 29.4 |
| | | P/Po | — | 1.02 | 1.06 | 1.19 |
| Comparative exam. 1 | 98.4 | P (μm) | 311.6 | 342.7 | 413.9 | (Note 1) |
| | | P/Po | — | 1.10 | >1.3 | (Note 1) |

Note 1:
The values exceeded 500; hence they could not be measured.

COMPARATIVE EXAMPLE 1

An optically active compound d expressed by the formula

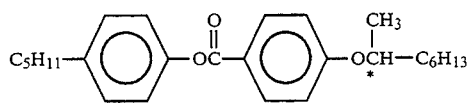

was added in a quantity of 1% by weight to the nematic liquid crystal mixture A, in place of the chiral agent compound c in Example 1, to prepare a mixture A-6. The V.H.R. of this mixture and the helical pitches after treatment with an adsorbent are shown in Table 4 together with the results of Example 1.

EXAMPLE 2

A liquid crystal composition N1 consisting of the following compounds was prepared:

| | | |
|---|---|---|
| C$_7$H$_{15}$—⬡—◯(F)—F | 7.00 | parts by wt. |
| Nematic mixture A | 50.00 | parts by wt. |
| C$_2$H$_5$—⬡—CH$_2$CH$_2$—⬡—◯(F)—F | 1.60 | parts by wt. |
| C$_3$H$_7$—⬡—CH$_2$CH$_2$—⬡—◯(F)—F | 0.80 | parts by wt. |
| C$_5$H$_{11}$—⬡—CH$_2$CH$_2$—⬡—◯(F)—F | 1.60 | parts by wt. |
| C$_2$H$_5$—⬡—⬡—◯(F)—F | 5.75 | parts by wt. |
| C$_3$H$_7$—⬡—⬡—◯(F)—F | 5.75 | parts by wt. |
| C$_5$H$_{11}$—⬡—⬡—◯(F)—F | 11.50 | parts by wt. |

C₂H₅—⟨⟩—⟨⟩—⟨O⟩—F        5.00 parts by wt.

C₃H₇—⟨⟩—⟨⟩—⟨O⟩—F        4.00 parts by wt.

This composition exhibited a clearing point of 80.6° C. and an optical anisotropy value of 0.090. A chiral agent compound e expressed by the formula:

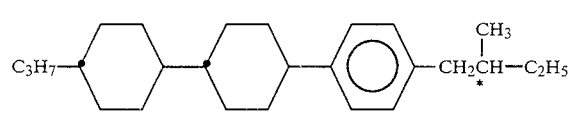

was mixed in a quantity of 0.1 part by weight with the above composition to prepare a chiral nematic liquid crystal composition N1-1. The V.H.R. of this composition N1-1 and the change of the helical pitches after treatment with an adsorbent are shown in Table 5.

TABLE 5

| | V.H.R. (%) | | Proportion of adsorbent added (wt. %) | | | |
|---|---|---|---|---|---|---|
| | | | 0 | 1.0 | 3.0 | 10.0 |
| Example 2 | 98.0 | P (μm) | 18.5 | 18.7 | 18.6 | 18.7 |
| | | P/Po | — | 1.01 | 1.00 | 1.01 |
| Comparative exam. 2 | 97.5 | P (μm) | 14.1 | 15.5 | 18.6 | 42.0 |
| | | P/Po | — | 1.10 | 1.33 | 3.0 |

COMPARATIVE EXAMPLE 2

A chiral agent compound f of the formula

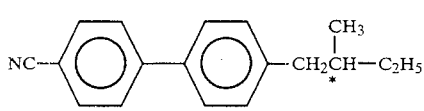

was mixed in a quantity of 1% by weight with the liquid crystal mixture N1 prepared in Example 2 to prepare a chiral nematic liquid crystal composition N1-2. The characteristics of this composition were measured in the same manner as in Example 2. The results are shown in Table 5 together with the results of Example 2.

EXAMPLE 3

A liquid crystal mixture N2 consisting of compounds expressed by the following formulas was prepared:

C₃H₇—⟨⟩—⟨O⟩—OC₂H₅        9.0 parts by wt.

Nematic mixture A        37.0 parts by wt.

C₂H₅—⟨⟩—CH₂CH₂—⟨⟩—⟨O⟩(F,F)        10.8 parts by wt.

C₃H₇—⟨⟩—CH₂CH₂—⟨⟩—⟨O⟩(F,F)        5.4 parts by wt.

C₅H₁₁—⟨⟩—CH₂CH₂—⟨⟩—⟨O⟩(F,F)        10.8 parts by wt.

C₃H₇—⟨⟩—⟨⟩—⟨O⟩—CH₃        6.0 parts by wt.

C₂H₅—⟨⟩—⟨O⟩—⟨O⟩—F        6.0 parts by wt.

C₃H₇—⟨⟩—⟨O⟩—⟨O⟩—F        5.0 parts by wt.

C₃H₇—⟨⟩—⟨⟩—⟨O⟩—OCF₃        10.0 parts by wt.

Chiral compound e used in Example 2 was mixed in a quantity of 0.23% by weight with the above mixture N2 to prepare a liquid crystal composition N2-1.

The characteristics of this composition after treatment with an adsorbent are shown in Table 6.

TABLE 6

| Example No. | 3 | 4 | 5 | 6 | 7 | 8 | 9 | 10 |
|---|---|---|---|---|---|---|---|---|
| Clearing point (°C.) | 104.0 | 86.0 | 91.6 | 86.8 | 98.0 | 91.0 | 93.0 | 83.6 |
| Refractive index | 0.090 | 0.088 | 0.130 | 0.162 | 0.094 | 0.075 | 0.091 | 0.087 |
| Pitch (μm) | 79 | 82 | 75 | 18 | 91 | 150 | 88 | 90 |

EXAMPLE 4

A liquid crystal mixture N3 consisting of compounds expressed by the following formulas was prepared and the chiral compound c used in Example 1 was mixed in a quantity of 0.3% by weight with the mixture N3 to prepare a chiral nematic liquid crystal composition N3-1:

C₅H₁₁—⟨⟩—⟨O⟩—OCF₃        9.0 parts by wt.

Nematic mixture A        50.0 parts by wt.

C₂H₅—⟨⟩—CH₂CH₂—⟨⟩—⟨O⟩(F,F)        8.4 parts by wt.

C₃H₇—⟨⟩—CH₂CH₂—⟨⟩—⟨O⟩(F,F)        4.2 parts by wt.

| | |
|---|---|
| C₅H₁₁—⌬—CH₂CH₂—⌬—⬡(F)(F) | 8.4 parts by wt. |
| C₂H₅—⌬—⬡—⬡(F)(F) | 5.0 parts by wt. |
| C₃H₇—⌬—⬡—⬡(F)(F) | 5.0 parts by wt. |
| C₅H₁₁—⌬—⬡—⬡(F)(F) | 10.0 parts by wt. |

The characteristic values of the composition N3-1 are shown in Table 6 together with the results of Example 3.

EXAMPLE 5

A liquid crystal mixture N4 consisting of compounds expressed by the following formulas was prepared:

| | |
|---|---|
| C₇H₁₅—⌬—⬡(F)(F) | 10.00 parts by wt. |
| C₅H₁₁—⌬—CH₂CH₂—⬡(F)(F) | 10.00 parts by wt. |
| Nematic mixture A | 22.00 parts by wt. |
| C₂H₅—⌬—⬡—⬡(F)(F) | 7.25 parts by wt. |
| C₃H₇—⌬—⬡—⬡(F)(F) | 7.25 parts by wt. |
| C₅H₁₁—⌬—⬡—⬡(F)(F) | 14.50 parts by wt. |
| C₃H₇—⌬—⌬—⬡(F) | 5.00 parts by wt. |
| C₃H₇—⌬—CH₂CH₂—⬡—C≡C—⬡—C₂H₅ | 3.00 parts by wt. |
| C₃H₇—⌬—CH₂CH₂—⬡—C≡C—⬡—C₃H₇ | 3.00 parts by wt. |
| C₃H₇—⌬—CH₂CH₂—⬡—C≡C—⬡—C₄H₉ | 3.00 parts by wt. |

-continued

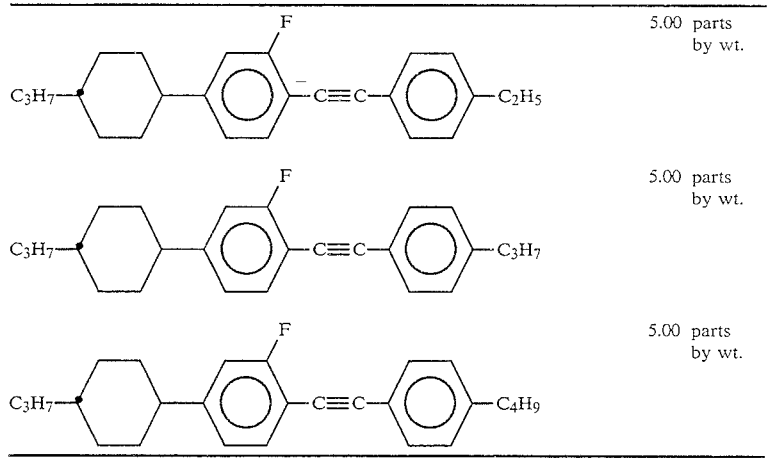

5.00 parts by wt.

5.00 parts by wt.

5.00 parts by wt.

A chiral agent compound g expressed by the following formula was mixed in a quantity of 0.3% by weight with the above mixture N4 to prepare a chiral nematic liquid crystal composition N4-1:

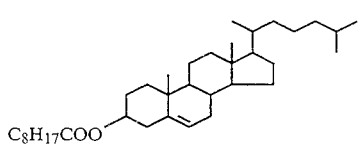

The characteristic values of the composition N4-1 are shown in Table 6.

EXAMPLE 6

A nematic liquid crystal mixture N5 consisting of compounds expressed by the following formulas was prepared:

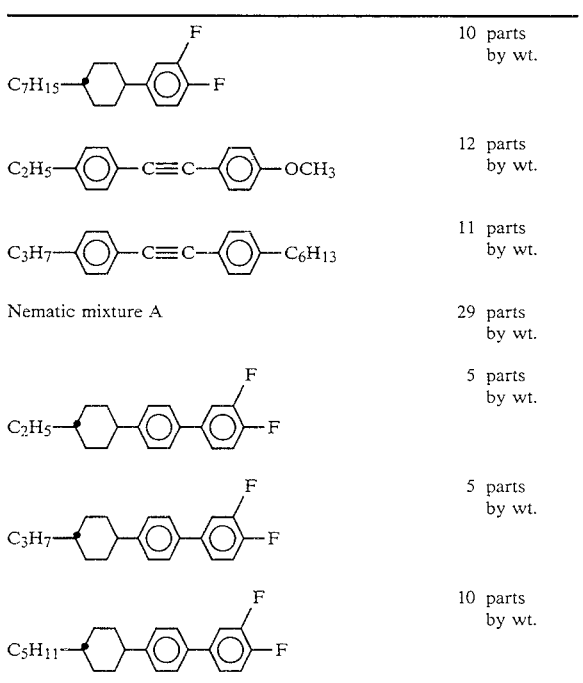

10 parts by wt.

12 parts by wt.

11 parts by wt.

Nematic mixture A 29 parts by wt.

5 parts by wt.

5 parts by wt.

10 parts by wt.

-continued

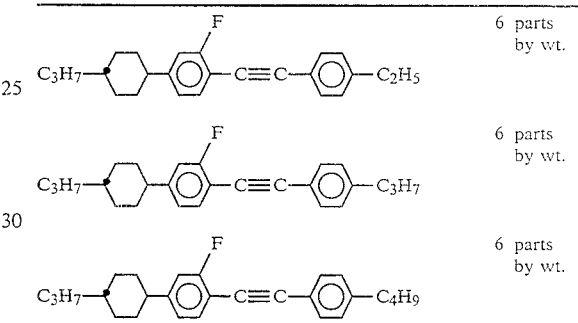

6 parts by wt.

6 parts by wt.

6 parts by wt.

The chiral agent compound e used in Example 2 was mixed in a quantity of 1% by weight with the above mixture N5 to prepare a chiral nematic liquid crystal composition N5-1. The characteristics of the composition N5-1 after treatment with an adsorbent are shown in Table 6.

EXAMPLE 7

A nematic liquid crystal mixture N6 consisting of compounds expressed by the following formulas was prepared:

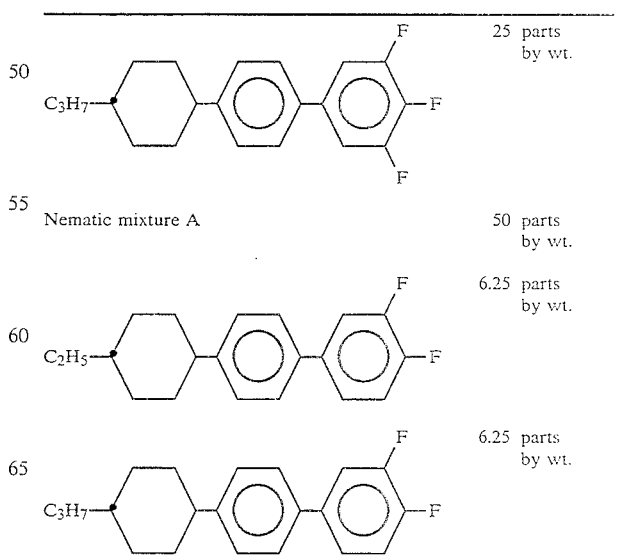

25 parts by wt.

Nematic mixture A 50 parts by wt.

6.25 parts by wt.

6.25 parts by wt.

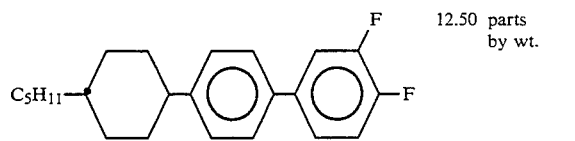 12.50 parts by wt.

The chiral agent compound e used in Example 2 was mixed in a quantity of 0.2% by weight with the above mixture N6 to prepare a chiral nematic composition N6-1. The characteristics of this composition are shown in Table 6.

EXAMPLE 8

A compound of the formula

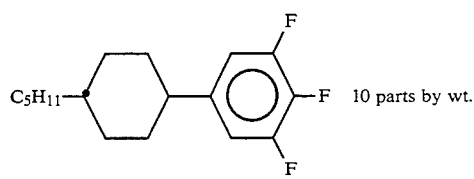 10 parts by wt.

was mixed with the nematic mixture A (90 parts by weight) prepared in Example 1, to prepare a nematic mixture N7. A chiral compound h expressed by the formula

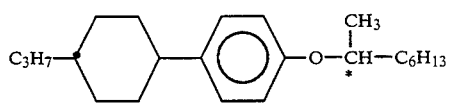

was added in a quantity of 1.0% by weight to the above mixture N7 to prepare a chiral nematic composition N7-1. Its characteristic values are shown in Table 6.

EXAMPLE 9

A nematic mixture N8 consisting of compounds expressed by the following formulas was prepared:

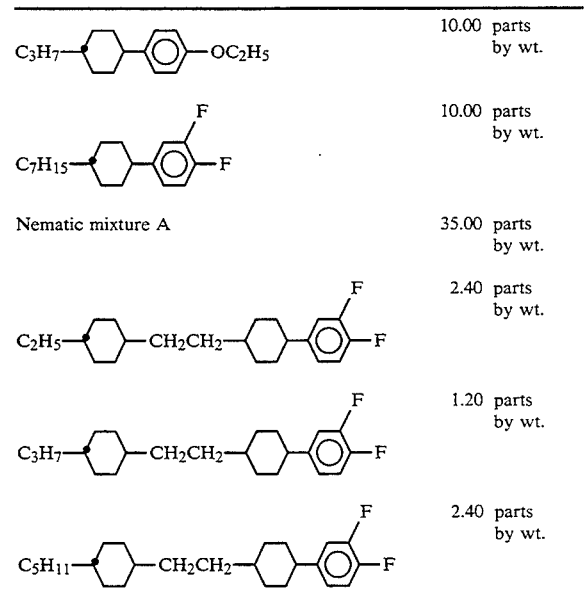

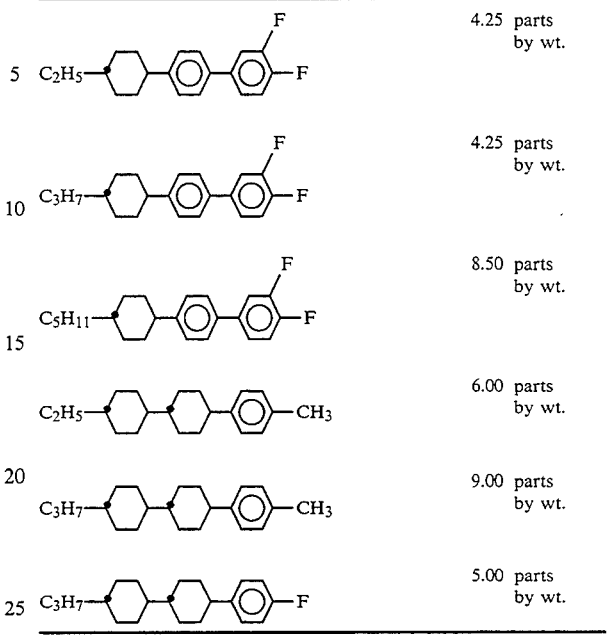

The chiral compound e used in Example 2 was mixed in a quantity of 0.2% by weight with the mixture N8 to prepare a chiral nematic liquid crystal composition N8-1. The characteristic values of this composition are shown in Table 6.

EXAMPLE 10

A nematic mixture N9 consisting of compounds expressed by the following formulas was prepared:

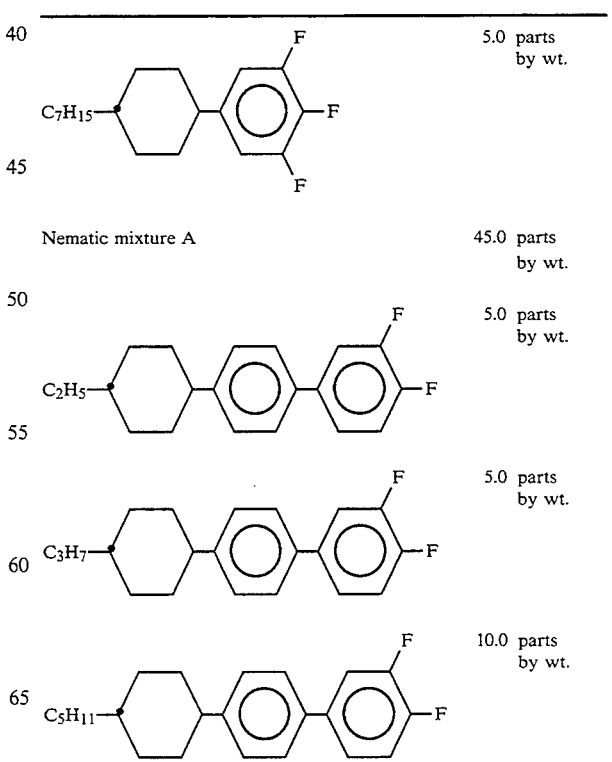

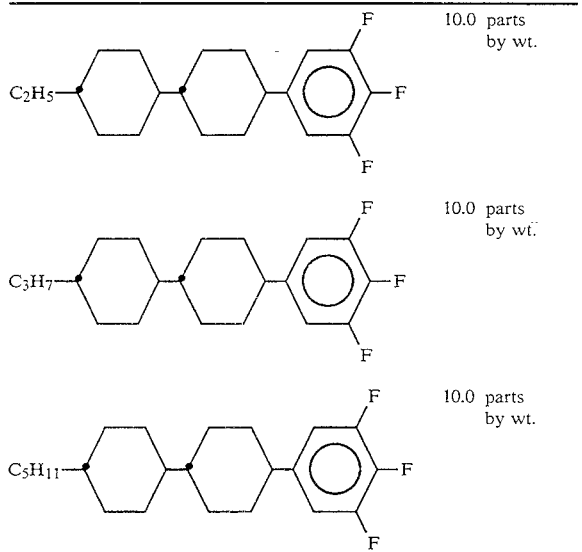

10.0 parts by wt.

10.0 parts by wt.

10.0 parts by wt.

Chiral compounds i and j of the following formulas

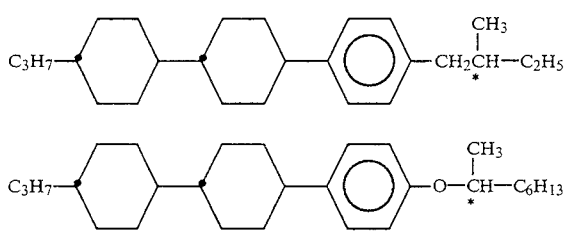

were mixed in quantities of 0.10% by weight and 0.50% by weight, respectively, with the mixture N9 to prepare a chiral nematic composition N9-1. The characteristic values of this composition are shown in Table 6.

Effectiveness of the Invention

As described above, the liquid crystal composition of the present invention is a liquid crystal material having a high, voltage-holding ratio, and being hardly extended in its chiral pitch by adsorption treatment with silica gel or the like or by purification treatment according to column chromatography using such a packing.

What we claim is:

1. A liquid crystal composition consisting essentially of at least one achiral compound expressed by the following formula (IV):

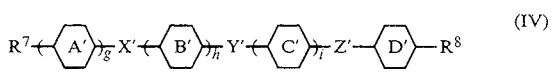

wherein six-membered rings A', B', C' and D' each independently represent trans-1,4-cyclohexylene, 1-cyclohexene-1,4-diyl or 1,4-phenylene; g, h and i each represent 0 or 1; $(g+h+i) \geq 1$; X', Y' and Z' each independently represent a single bond, —CH$_2$CH$_2$—, —CH=CH— or —C≡C—; $R^7$ represents —C$_n$H$_{2n+1}$, —C$_n$H$_{2n-1}$ or —C$_n$H$_{2n+1}$OC$_k$H$_{2k}$; $R^8$ represents —C$_m$H$_{2m+1}l$, C$_m$H$_{2m+1}$O—, F, CHF$_2$O— or CF$_3$O—; n and m each independently represent an integer of 1 to 18; k represents an integer of 1 to 17; $(n+k)$ represents an integer of 2 to 18; at least one of X', Y' and Z' represents a single bond; when ring D' represents 1,4-phenylene and $R^8$ represents F, CHF$_2$O— or CF$_3$O—, H at its ortho-position relative to $R^8$ may be replaced by F; and when g represents 1 and ring B' or C' represents 1,4-phenylene, H at the side position of the ring may be replaced by F; and at least one chiral compound selected from the group consisting of optically active compounds expressed by the following formulas (III) and (V):

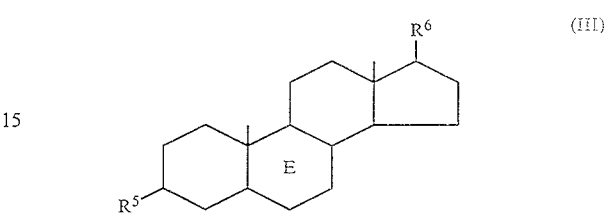

wherein $R^5$ represents H, F, —C$_n$H$_{2n+1}$, C$_n$H$_{2n+1}$O—, C$_n$H$_{2n+1}$COO—, C$_n$H$_{2n+1}$OCO—, —C$_n$H$_{2n-1}$, C$_n$H$_{2n-1}$O—, C$_n$H$_{2n-1}$COO—, C$_n$H$_{2n-1}$OCO—, C$_n$H$_{2n+1}$-Ph-COO- or C$_n$H$_{2n+1}$-Ph-OCO- wherein n represents an integer of 1 to 18 and Ph represents 1,4-phenylene; $R^6$ represents H, —C$_n$H$_{2n+1}$ or —C$_n$H$_{2n-1}$ wherein n represents an integer of 1 to 18; and ring E represents a condensed ring having only one double bond at its 5-6, 6-7 or 7-8 position or a condensed ring wherein the hydrogen atom(s) at its 5- or 6-position may be replaced by an alkyl group or an alkoxy group of 1 to 18 carbon atoms;

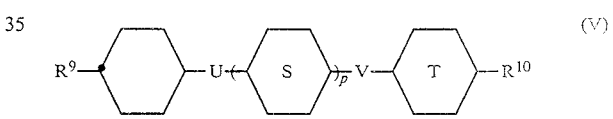

wherein six-membered rings S and T each represent trans-1,4-cyclohexylene or 1,4-phenylene; when ring T represents 1,4-phenylene, then H at its 2- or 3-position may be replaced by F; p represents 0 or 1; U and V each represent a single bond or —C$_2$CH$_2$—, but are not simultaneously —CH$_2$CH$_2$; $R^9$ represents —C$_n$H$_{2+1}$; n represents an integer of 1 to 18; $R^{10}$ is expressed by the following partial formula (VI):

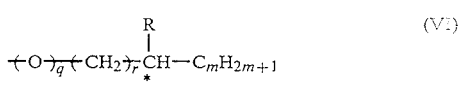

wherein q and r each independently represent 0 or 1; m represents an integer of 2 to 12; and R represents F or CH$_3$—.

2. A liquid crystal compostiion according to claim 1, wherein said at least one chiral compound is an optically active compound expressed by the formula (V).

3. A liquid crystal composition according to claim 1, wherein said at least one chiral compound is an optically active compound expressed by the formula (III).

4. A liquid crystal compostiion according to claim 1, wherein said at least one chiral compound is an optically active compound expressed by the following formula (VIII):

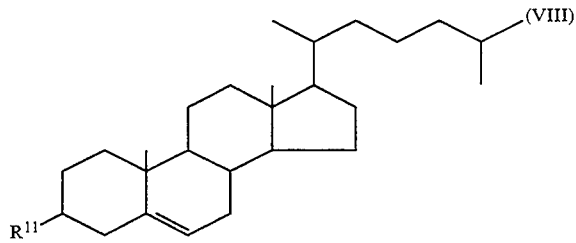

wherein $R^{11}$ represents H, F, $-C_nH_{2n+1}$, $C_nH_{2n+}O-$, $C_nH_{2n+}COO-$, $C_nH_{2n+}OCO-$, $-C_nH_{2n-1}$, $C_nH_{2n-1}O-$, $C_nH_{2n-1}COO-$ or $C_nH_{2n-1}OCO-$; and n represents an integer of 1 to 18.

5. A liquid crystal display device comprising a liquid crystal composition as defined in claim 1.

6. A liquid crystal display device comprising a liquid crystal compostiion as defined in claim 2.

7. A liquid crystal display device comprising a liquid crystal composition as defined in claim 3.

8. A liquid crystal display device comprising a liquid crystal composition as defined in claim 4.

* * * * *

UNITED STATES PATENT AND TRADEMARK OFFICE
CERTIFICATE OF CORRECTION

PATENT NO. : 5,439,613                                 Page 1 of 2
DATED     : August 8, 1995
INVENTOR(S) : Fusayuki TAKESHITA, Taku HIROSE, Kanetsugu
              TERASHIMA, and Shinichi SAWADA It is certified that error appears in the above-indentified patent and that said Letters Patent is hereby corrected as shown below:

On the title page,
   item [75] in the heading of the patent, change "Sinichi Sawada" to --Shinichi Sawada--.

In column 39, line 64, change "$-C_mH_{2m+1}$/" to -- $-C_mH_{2m+1}$ --, and change "$C_mH_{2m+1}O-$" to -- $C_mH_{2m+1}O-$ --.

In column 40, line 20, change "$-C_n,H_{2n+1}$" to -- $-C_nH_{2n+1}$ --; and line 45, change "$-C_2CH_2-$" to -- $-CH_2CH_2-$ --.

UNITED STATES PATENT AND TRADEMARK OFFICE
CERTIFICATE OF CORRECTION

PATENT NO. : 5,439,613

DATED : August 8, 1995

INVENTOR(S) : Fusayuki TAKESHITA, Taku HIROSE, Kanetsugu TERASHIMA, and Shinichi SAWADA It is certified that error appears in the above-indentified patent and that said Letters Patent is hereby corrected as shown below:

In column 42, line 1, change "$C_nH_{2n+}O-$" to -- $C_nH_{2n+1}O-$ --; and line 2, change "$C_nH_{2n+}COO-$" to -- $C_nH_{2n+1}COO-$ --, and change "$C_nH_{2n+}OCO-$" to -- $C_nH_{2n+1}OCO-$ --.

Signed and Sealed this

Twenty-sixth Day of December, 1995

Attest:

BRUCE LEHMAN

*Attesting Officer*  *Commissioner of Patents and Trademarks*